United States Patent
Castellanos et al.

(10) Patent No.: US 6,464,870 B1
(45) Date of Patent: Oct. 15, 2002

(54) FILTER ASSEMBLY HAVING PLASTIC MESH CONDUCTIVE SURROUND

(75) Inventors: Edwin A. Castellanos, Findlay; Gary L. Rickle, Wharton, both of OH (US)

(73) Assignee: Kuss Corporation, Findlay, OH (US)

( * ) Notice: Subject to any disclaimer, the term of this patent is extended or adjusted under 35 U.S.C. 154(b) by 50 days.

(21) Appl. No.: 09/634,420

(22) Filed: Aug. 8, 2000

(51) Int. Cl.⁷ .................. B01D 25/00; B01D 27/06; B01D 29/07
(52) U.S. Cl. .................. 210/243; 210/315; 210/484; 210/489; 210/493.2
(58) Field of Search ................. 210/243, 314, 210/315, 323.2, 335, 484, 489, 488, 493.1, 493.2; 55/360

(56) References Cited

U.S. PATENT DOCUMENTS

| | | |
|---|---|---|
| 3,933,643 A | 1/1976 | Colvin et al. |
| 4,948,515 A | 8/1990 | Okumura et al. |
| 4,999,108 A | 3/1991 | Koch et al. |
| 5,076,920 A | 12/1991 | Danowski et al. |
| 5,085,773 A | 2/1992 | Danowski |
| 5,164,084 A | 11/1992 | Danowski et al. |
| 5,164,879 A | 11/1992 | Danowski et al. |
| 5,213,882 A | 5/1993 | Sassa et al. |
| 5,229,200 A | 7/1993 | Sassa et al. |
| 5,324,579 A | 6/1994 | Sassa et al. |
| 5,380,432 A | 1/1995 | Brandt |
| 5,382,359 A | 1/1995 | Brandt |
| 5,415,768 A * | 5/1995 | Andelman |
| 5,527,569 A | 6/1996 | Hobson et al. |
| 5,597,479 A * | 1/1997 | Johnson |
| 5,716,522 A * | 2/1998 | Chilton et al. |
| 5,798,048 A | 8/1998 | Ries |
| 5,849,375 A | 12/1998 | Smith et al. |
| 5,898,560 A | 4/1999 | Flaynik, Jr. et al. |
| 5,902,480 A | 5/1999 | Chilton et al. |
| 5,928,507 A | 7/1999 | Chiga |
| 6,004,462 A | 12/1999 | Yamada et al. |
| 6,099,726 A * | 8/2000 | Gembolis et al. |

* cited by examiner

Primary Examiner—David A. Simmons
Assistant Examiner—Fred Prince
(74) Attorney, Agent, or Firm—Brinks Hofer Gilson & Lione

(57) ABSTRACT

A fuel filter assembly adapted for disposition in a housing includes an inner filtration element, an outer conductive surround and end caps which position and secure the filtration element and conductive surround. The filtration element preferably includes an outer layer of depth filtration media and an inner pleated paper element. The conductive surround is preferably conductive extruded plastic mesh. The end caps may be formed of a fuel tolerant plastic such as nylon or acetal. The filter assembly may be disposed in a housing having suitable inlet and outlet fittings and a conductive path for achieving electrical conductivity from the exterior of the housing to the conductive surround for facilitating draining off of an electrical charge.

21 Claims, 4 Drawing Sheets

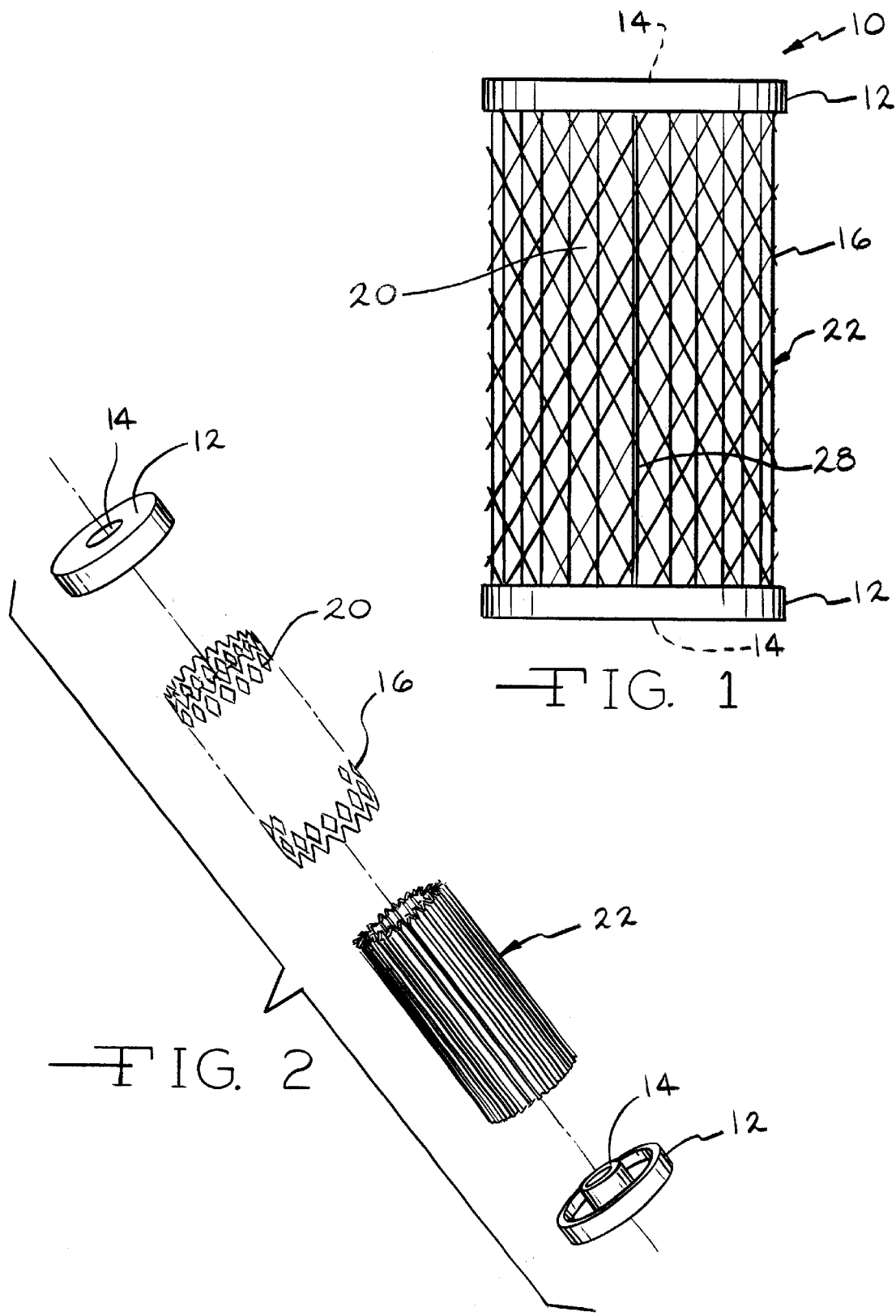

FILTER ASSEMBLY HAVING PLASTIC MESH CONDUCTIVE SURROUND

BACKGROUND OF THE INVENTION

The invention relates to a fuel filter assembly for use on motor vehicles and the like and more particularly to a fuel filter assembly having a conductive feature which facilitates draining off to ground the electrical charge generated by passage of fuel through the filter assembly.

For many years, fuel filters in motor vehicles comprised a filter element disposed within a metallic housing at a convenient location in the fuel line, often times in the engine compartment of the vehicle. While hoses to and from the housing were generally rubber and thus non-conductive, the housing was secured to a metal component or panel of the automobile and thus grounded. Accordingly, any electrostatic charge generated by passage of the fuel through the filtration element was readily and safely grounded through the filter housing to the motor vehicle body.

The constant examination of vehicle weight directed to weight reduction as well as continuing development of plastics and polymers has affected the fuel delivery and filtration systems of vehicles as it has most other vehicle systems. Rather than metal, filter housings are now frequently fabricated of a fuel tolerant plastic such as nylon. Such a construction results in a filtration element being isolated from the vehicle ground. An electrostatic discharge (ESD) may result as the charge in the filtration element increases and seeks ground. Frequently, such discharge occurs through the housing to the most proximate metallic vehicle body feature. Repeated discharge can result in leakage through the filter housing which is unacceptable.

In response to this problem, filtration devices have been developed which seek to eliminate electrostatic discharges and their consequences by providing a path to ground which prevents build up of an electrostatic charge. For example, U.S. Pat. No. 5,382,351 teaches plating the housing, inside and out, with a conductive material such as chromium, nickel or copper by vacuum metalization or sputtering.

United U.S. Pat. No. 5,898,560 discloses a filter having a conductive housing with an electrically conductive member and means for converting laminar flow to turbulent flow.

U.S. Pat. No. 4,999,108 teaches a fuel filtration device having a perforated metal cylinder with inner and outer filter elements. The cylinder is in contact with a wire in an end plate which communicates with a conductive mounting stud.

The foregoing are but three of many United States Patents directed to the above-referenced difficulty and it is therefore apparent that fuel filtration devices directed to minimizing or eliminating the problem of electrostatic discharge are highly desirable.

BRIEF SUMMARY OF THE INVENTION

A fuel filter assembly adapted for disposition in a housing includes an inner filtration element, an outer conductive surround and end caps which position and secure the filtration element and conductive surround. The filtration element preferably includes an outer layer of depth filtration media and an inner pleated paper element. The conductive surround is preferably conductive extruded plastic mesh. The end caps may be formed of a fuel tolerant plastic such as nylon or acetal. The filtration element may be disposed in a housing having suitable inlet and outlet fittings and a conductive path for achieving electrical conductivity from the exterior of the housing to the conductive surround for facilitating draining off of an electrical charge. In a preferred embodiment, the end caps are conductive plastic. In a first alternate embodiment, the end caps are non-conductive and the conductive mesh extends beyond the end caps. In a second alternate embodiment, an additional outer layer of depth filtration media disposed on the exterior of the preferred or first alternate embodiment filter assembly.

It is thus an object of the present invention to provide a fuel filter assembly intended to minimize electrostatic discharge.

It is a further object of the present invention to provide a fuel filter assembly having an inner filtration element and an outer conductive element.

It is a still further object of the present invention to provide a fuel filter assembly having a pleated paper filter surrounded by a depth media filtration layer.

It is a still further object of the present invention to provide a fuel filter assembly having a conductive, extruded mesh surround which cooperates with adjacent conductive elements to drain off electrostatic charge from fuel passing therethrough.

It is a still further object of the present invention to provide a fuel filter assembly and housing wherein a conductive mesh surround defines an electrical connection with the exterior of the housing to drain off electrostatic charges created by fuel filtration.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 1 is a side, elevational view of a preferred embodiment fuel filter assembly according to the present invention;

FIG. 2 is an exploded, perspective view of the preferred embodiment fuel filter assembly according to the present invention;

DESCRIPTION OF THE PREFERRED AND ALTERNATE EMBODIMENTS

Figure 3:
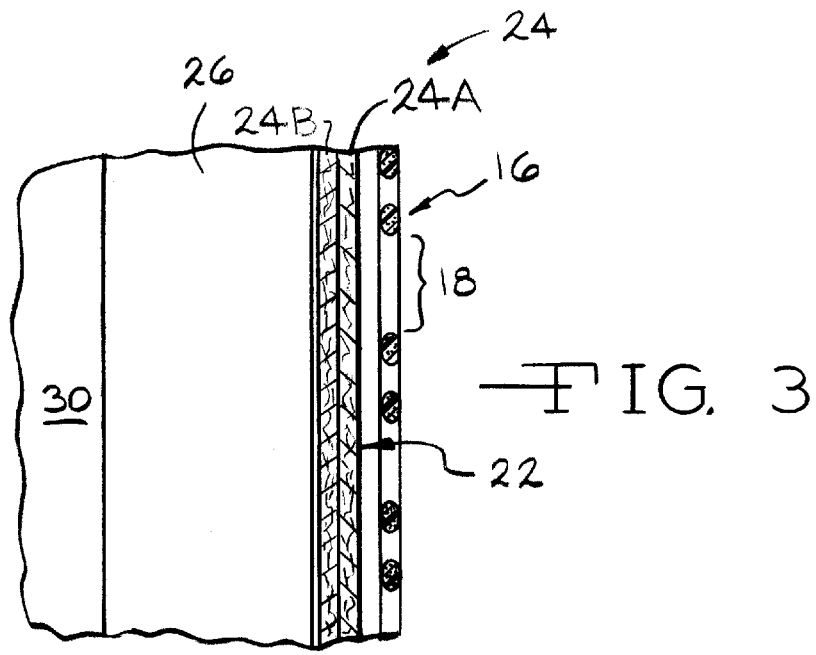
FIG. 3 is an enlarged, fragmentary, sectional view of the preferred embodiment filtration element according to the present invention.

Referring now to FIGS. 1 and 2, a preferred embodiment fuel filter assembly according to the present invention is illustrated and designated by the reference number 10. The preferred embodiment fuel filter assembly 10 includes a pair of circular discs or end caps 12 each having a coaxial, circular opening or passageway 14 formed therein. The end caps 12 preferably define a relatively large diameter to height ratio. The end caps 12 are also preferably molded of an electrically conductive plastic material such as acetal, nylon or polyethylene which has been doped and rendered electrically conductive by the addition of a material such as carbon black. Extending between the opposed inner faces of the end caps 12 is a cylindrical conductive mesh sleeve 16. The mesh sleeve 16 is circumferentially continuous and is preferably a conductive, extruded plastic or polymer such as nylon, acetal or polyethylene. The mesh sleeve 16 preferably includes oblique strands or filaments 18 which define rhomboidal (diamond) shaped openings 20 having sides on the order of 0.1 inch to 0.2 inch (2.5 mm to 5.1 mm). The mesh sleeve 16 is received within and mechanically secured to the conductive end caps 12 by virtue of the end caps 12 being in-situ molded thereupon. Accordingly, the conductive mesh sleeve 16 defines a collector for electrostatic charges which develop as fuel passes through the filter assembly 10 which is electrically coupled to the end caps 12. Furthermore, the conductive mesh sleeve 16 acts as a rugged, abrasion resistant surround, enveloping and protecting the internal components of the fuel filter assembly 10.

Disposed within the conductive mesh sleeve 16 is a pleated filter element 22. The pleated filter element 22 is illustrated in FIGS. 2 and 3 and includes an outer region of depth filtration media 24. As utilized herein, the terms depth media and depth filtration media refer generally to those classes and types of filtration media comprised of non-woven fibers or filaments which are coarser at an outer surface and finer at an inner surface to provide staged filtration whereby first larger and then smaller particulate matter is filtered from fuel as the fuel moves from outside the filter toward the inside. Specifically, an outer layer of the depth media 24A is preferably spun bonded nylon fibers or filaments but may be spun bonded polyester, acetal, Teflon (polytetrafluoroethylene) or other stable, fuel tolerant material. Teflon is a registered trademark of the E.I. Dupont deNemours Co. As utilized herein, the terms spun bonded filaments and spun bonded filtration media refer to that class of non-woven materials wherein the filaments are cooled by the application of cold air immediately upon forming to stop attenuation thereof. Typically, the diameters of such filaments will be on the order of 100 microns and may readily range from between 50 microns to 200 microns. The depth filtration media 24 also includes an inner layer 24B of finer, melt blown filaments. As utilized herein, the terms melt blown filaments and melt blown filtration media refer to that class of non-woven materials wherein the filaments are maintained at an elevated temperature by the application of hot air immediately upon forming to encourage attenuation thereof. Typically, melt blown filaments are on the order of 10 times smaller than spun bonded filaments and thus are nominally 10 microns in diameter and may readily vary between 5 and 20 microns. The melt blown filaments may also be nylon, polyester, acetal, Teflon or other stable, fuel tolerant material.

This graduated filament size and corresponding graduated pore size has the effect of first filtering out larger particulate matter in the outer layer 24A of spun bonded materials and then filtering out smaller particulate matter on the inner layer 24B of melt blown filaments. The depth filtration media 24 is secured to and supported upon a pleated paper filter element 26. As such, it conforms to the outer surface of the paper element 26 and is thus also pleated. The pleated paper element 26 preferably includes pleats which are between approximately 5/16 inch to 3/8 inch (8 mm to 9.5 mm) wide.

There are preferably between about 22 and 26 pleats around the circumference of the paper element 26. A full length, preferably metallic, clamp member 28 is disposed over the adjacent longitudinal edges of the filter element 22 and pressed together to effect a seal along the longitudinal edges. Sealing of the longitudinal edges may also be achieved through use of an adhesive, folding, stitching and other analogous means. The filter element 22 is similarly mechanically bonded to the end caps 12 by virtue of in-situ molding of the end caps 12 thereupon which provides a secure fluid tight seal at each end of the filter element 22. A center axial passageway 30 gathers fuel which has passed through the filter element 22 and communicates with the openings or passageways 14 in the end caps 12.

Figure 4:
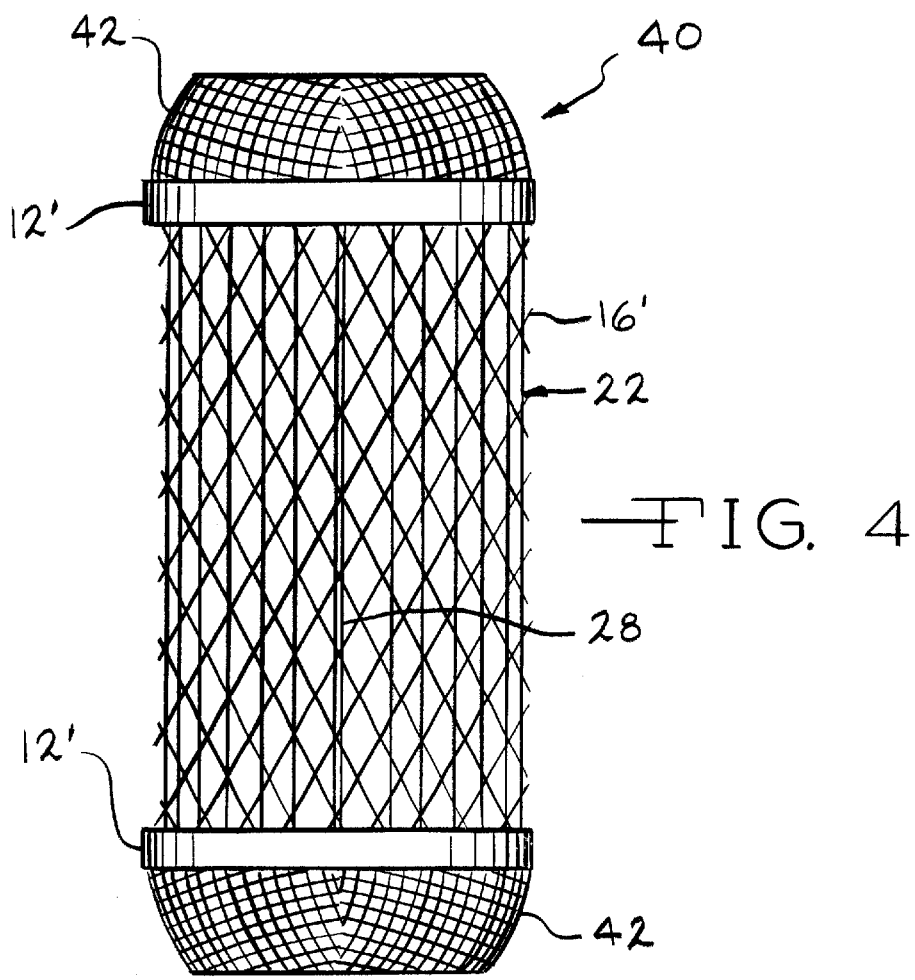
FIG. 4 is a side, elevational view of a first alternate embodiment fuel filter assembly according to the present invention.

Referring now to FIG. 4, a first alternate embodiment filter assembly is illustrated and designated by the reference number 40. The first alternate embodiment filter assembly 40 is similar in most respects to the preferred embodiment filter assembly 10 and includes the pleated filter element 22 having the depth media layers 24, the pleated paper element 26 and the metallic clamp member 28. Here, however, the conductive mesh sleeve 16' defines a length significantly longer than the axial distance between the end caps 12. Once again, a pair of end caps 12' are molded in-situ over the filter element 22 such that it is mechanically and sealingly secured therebetween. Similarly, the conductive mesh sleeve 16' is molded into the end caps 12' but with a certain overhanging portion 42 on the order of 0.25 inch to 0.5 inch (6.3 mm to 12.7 mm) extending beyond the end caps 12'. In this embodiment, the end caps 12' may be fabricated of a non-conductive fuel tolerant material such as acetal, nylon or polyethylene. The end caps 12' preferably each include an opening or passageway 14 illustrated in FIG. 2 which provides fluid communication with the interior of the first alternate embodiment fuel filter assembly 40 as described above with referenced FIG. 3.

Figure 5:
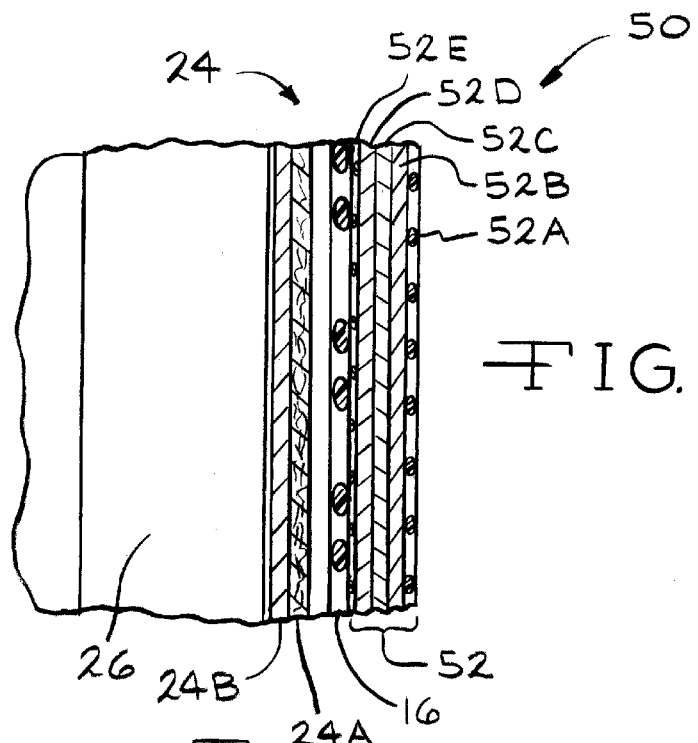
FIG. 5 is an enlarged, fragmentary, sectional view of a second alternate embodiment fuel filtration element according to the present invention.

Turning now to FIG. 5, a second alternate embodiment of the fuel filter assembly 10 is illustrated and generally designated by the reference number 50. In FIG. 5, only a cross section of the filter element 22' is illustrated inasmuch as this presents the only difference between it and the filter element 22 of the preferred and alternate embodiments 10 and 40, respectively. As illustrated in FIG. 5, the second alternate embodiment pleated filter element 22' includes either the cylindrical conductive mesh sleeve 16 or 16' which surrounds the filter element 22'. The filter element 22' includes the depth filtration media 24 which, in turn, includes a coarse outer layer 24A of spun bonded material and a finer inner layer 24B of melt blown material on the surface of the paper filter element 26. Again, it will be appreciated that the depth filtration media 24 resides on the outer surface of the paper element 26 and is thus pleated and corresponds to the paper element 26. Surrounding the entire filter and specifically disposed adjacent and outside the conductive sleeve 16 and extending between the end caps 12 and molded in-situ therewith is an external sleeve of depth media 52. The depth media sleeve 52 includes outer and inner layers 52A and 52E of fine extruded mesh of a fuel tolerant material such as nylon, acetal or polyethylene, two intermediate layers 52B and 52D of spun bonded media and a center layer 52C of a melt blown material. The descriptions of spun bonded and melt blown media appearing above with regard to the preferred embodiment apply with equal accuracy and force to the depth media sleeve 52 herein referenced in the second alternate embodiment 50. Further information regarding this material appears in co-owned U.S. Pat. No. 5,716,522 which is hereby incorporated by reference. As noted above, the second alternate embodiment filter assembly 50 may be utilized with either the preferred embodiment conductive end caps 12 as illustrated in FIG. 1 or the overhanging conductive mesh 16' and non-conductive end caps 12' of the first alternate embodiment illustrated in FIG. 4.

Figure 6:
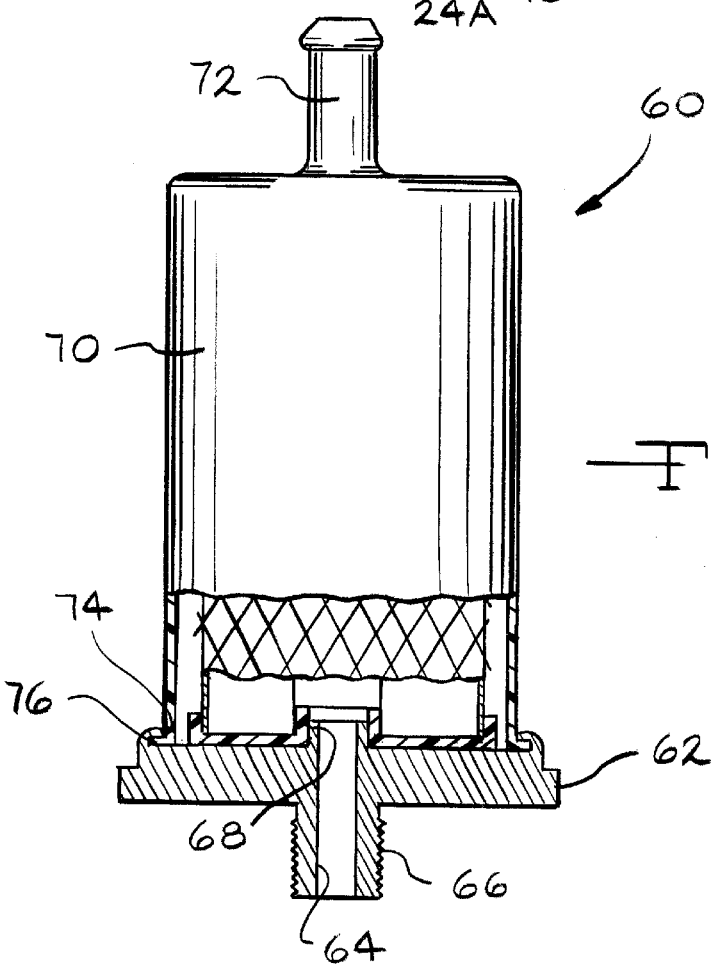
FIG. 6 is a side, elevational view with a portion broken away of a fuel filter assembly according to the present invention disposed in a housing.
Figure 7:
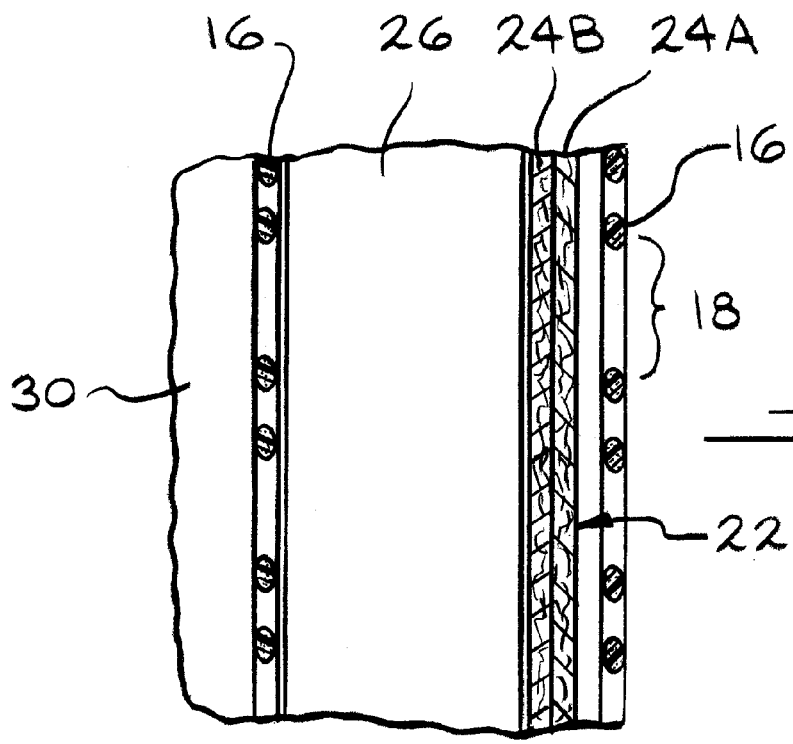
FIG. 7 is an enlarged, fragmentary, sectional view of a third alternate embodiment fuel filtration element according to the present invention.
Figure 8:
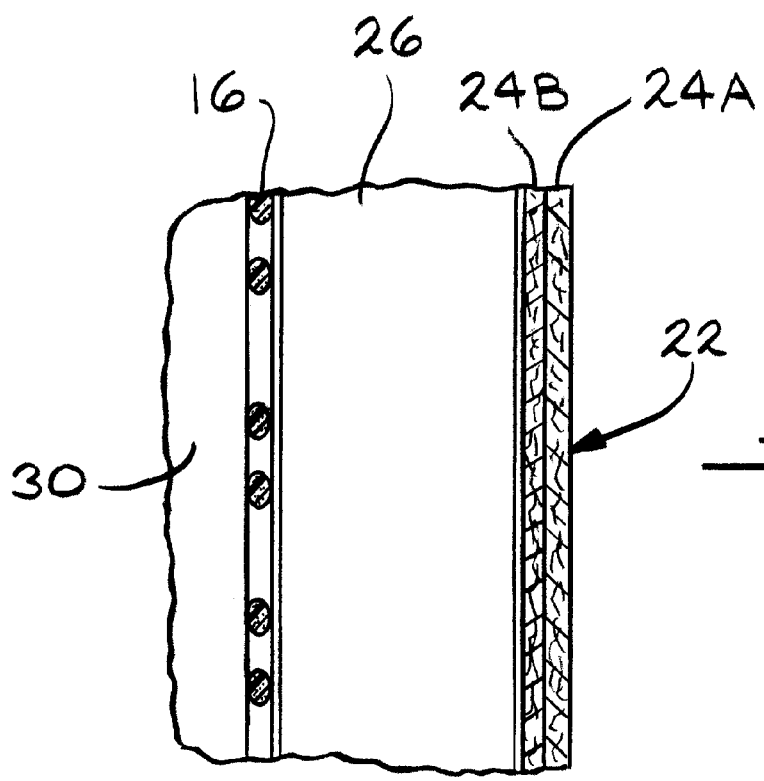
FIG. 8 is an enlarged, fragmentary, sectional view of a fourth alternate embodiment fuel filtration element according to the present invention.

Turning now to FIG. 6, a typical working environment for any one of the fuel filter assemblies 10, 40 or 50 is illustrated. In such environment, a housing assembly 60 preferably includes a metal base or end bell 62 having a concentric center passageway 64 defined by a threaded stub 66 and a post or stanchion 68 having an outside diameter equal to or just slightly greater than the inside diameter of the opening or passageway 14 of one of the filter assemblies 10, 40 or 50 such that the filter assembly is securely retained thereon. As such, either one of the conductive end caps 12 or the conductive overhanging mesh 42 is in intimate contact with the internal surface of the end bell 62, thereby ensuring an electrically conductive path between the conductive mesh sleeve 16, the end bell 62 and the grounded device such as a fuel injection system (not illustrated) within the motor vehicle to which it is secured.

The housing assembly 60 also includes a cylindrical housing 70 having an inlet fitting 72 and an outlet flange 74 which is received within and retained by a rolled flange 76 on the end bell 62. The inlet fitting 72 is adapted to receive a hose or similar fuel handling component. It will be appreciated that the housing assembly 60, if utilized with the filter assemblies 10, 40 and 50 disclosed herein, must include a structure or feature for sealing off the opening or passageway 14 in the filter element 10 adjacent the inlet fitting 72. This may be any type of centering and securing structure formed integrally with the housing 70 or inserted therein which includes a plug or sealing structure which engages and seals the opening or passageway 14 adjacent the inlet fitting 72.

It will also be appreciated that the filter assemblies 10, 40 and 50 according to the present invention are preferably symmetrical about a radial mid-plane, that is, their ends are identical with regard to the openings 14, the conductive or non-conductive caps 12 or 12' and the overhanging mesh 42. This renders the filter assemblies 10, 40 and 50 orientation insensitive and simplifies the manufacturing process and related molds and equipment. However, and by way of one example, the filter assemblies 10, 40 or 50 may be fabricated with only an opening or passageway 14 in one end cap 12. Such a single opening 14 must, of course, be oriented such that it engages the post or stanchion 68 on the end bell 62 when the filter is assembled as illustrated in FIG. 6 in order for it to function properly.

Similarly, the preferred embodiment filter assembly 10 may be fabricated with only one conductive end cap 12, the other end cap being nonconductive like the end caps 12' of the first alternate embodiment 40 and the first alternate embodiment filter assembly 40 may be fabricated with only one overhanging mesh portion 42. These options are a consequence of the filter assembly typically being utilized in a housing assembly 60 having only one conductive feature such as the end bell 62 which physically and electrically contacts only one of either the conductive end cap 12 or the overhanging mesh 42. However, if this option is utilized, it must be appreciated that the filter assemblies 10, 40 and 50 are again orientation sensitive, that is, they must only be installed in one orientation within the housing assembly 60 in order to perform properly. If, however, the above-discussed alternative of utilizing end caps 12 or 12' only one of which includes an opening or passageway 14 is adopted, the single opening or passageway 14 is placed in the end cap 12 which is conductive or which includes the overhanging mesh 42. In this instance, the likelihood of proper assembly and operation is greatly enhanced.

Thus it will be appreciated that a preferred embodiment and two alternate embodiment filter assemblies as well as a typical housing for the filter assemblies of the various embodiments have been disclosed and fully described. All of the embodiments provide a fuel filtration assembly capable of drawing off or draining electrostatic charges generated in fuel as it passes through the filtration element. The preferred embodiment filter assembly 10 includes conductive outer mesh 16 which cooperates with conductive end caps 12 to collect and drain off electrostatic charge to a feature in a housing. The first alternate embodiment 40 teaches a filter element 40 wherein end caps 12' are fabricated of non-conductive material and the overhanging mesh 42 of the conductive sleeve 16' provide a pathway to the grounding end bell 62. The second alternate embodiment 50 discloses a filter having the desired electrostatic draining characteristics but with additional filtration media disposed about its periphery.

The foregoing disclosure is the best mode devised by the inventors for practicing this invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An electrically conductive filter assembly, comprising, in combination:

a pair of end caps, a conductive mesh surround fabricated of a polymer containing conductive particles, said mesh surround molded into said end caps, and a filtration element having at least two filtration media disposed within said mesh surround extending between and molded into said end caps.

2. The electrically conductive filter assembly of claim 1 wherein said pair of ends caps are circular and at least one of said end caps defines a through opening.

3. The electrically conductive filter assembly of claim 1 wherein said conductive mesh surround is circumferentially continuous, extruded mesh.

4. The electrically conductive filter assembly of claim 1 wherein said conductive mesh surround is fabricated of nylon, acetal or polyethylene and said conductive particles are carbon.

5. The electrically conductive filter assembly of claim 1 wherein said filtration element includes an inner pleated paper element and an outer element comprising non-woven filaments.

6. The electrically conductive filter assembly of claim 1 wherein said conductive mesh surround extends beyond at least one of said end caps.

7. The electrically conductive filter assembly of claim 1 further including filter media surrounding said mesh surround.

8. An electrically conductive filter assembly comprising, in combination, a pair of end caps at least one of said end caps being conductive, a conductive mesh surround fabricated of a polymer and doped with conductive particles, said conductive mesh surround molded into said end caps, and a filtration element having a first, inner pleated paper filter and an outer filamentary filter layer, said filtration element molded into said end caps.

9. The electrically conductive filter assembly of claim 8 wherein said pair of ends caps are circular and at least one of said end caps defines a through opening and said conductive mesh surround and said filtration element are cylindrical.

10. The electrically conductive filter assembly of claim 8 said conductive mesh surround is continuous, extruded mesh.

11. The electrically conductive filter assembly of claim 8 wherein said conductive mesh surround is fabricated of nylon, acetal or polyethylene.

12. The electrically conductive filter assembly of claim 8 wherein said filtration element includes an inner pleated paper element and an outer element comprising non-woven filaments.

13. The electrically conductive filter assembly of claim 8 wherein said conductive mesh surround extends beyond at least one of said end caps.

14. The electrically conductive filter assembly of claim 8 further including a fibrous filter layer surrounding said conductive mesh surround.

15. The electrically conductive filter assembly of claim 8 further including a housing having an electrically conductive end bell in electrical communication with said conductive mesh surround.

16. An electrically conductive filter assembly comprising, in combination, a pair of end caps, a conductive mesh surround fabricated of a polymer including conductive particles, said conductive mesh surround molded into said end caps and extending axially beyond at least one of said end caps, a filtration element having a first, inner pleated paper filter and an outer filamentary filter layer, said filtration element molded into said end caps.

17. The electrically conductive filter assembly of claim 16 said conductive mesh surround is a continuous, extruded mesh.

18. The electrically conductive filter assembly of claim 16 further including a fibrous filter layer surrounding said conductive mesh surround.

19. The electrically conductive filter assembly of claim 16 wherein said conductive mesh surround is fabricated of nylon, acetal or polyethylene.

20. The electrically conductive filter assembly of claim 16 wherein said pair of ends caps are circular and at least one of said end caps defines a through opening.

21. The electrically conductive filter assembly of claim 16 further including a housing having an electrically conductive end bell in electrical communication with said conductive mesh surround.

\* \* \* \* \*